United States Patent [19]

Röeck

[11] 3,928,767

[45] Dec. 23, 1975

[54] APPARATUS FOR USE IN THE DETERMINATION OF FOCAL SPOT SIZE IN X-RAY TUBES

[76] Inventor: Werner Wilhelm Röeck, 41 Conlins Road, West Hill, Ontario, Canada

[22] Filed: Nov. 18, 1974

[21] Appl. No.: 524,922

[30] Foreign Application Priority Data
Nov. 20, 1973 United Kingdom............... 53751/73

[52] U.S. Cl.................................. 250/320; 250/323
[51] Int. Cl.² ........................................... G03B 5/17
[58] Field of Search ........... 250/320, 321, 322, 323, 250/475, 480

[56] References Cited
UNITED STATES PATENTS

| | | | |
|---|---|---|---|
| 3,748,470 | 7/1973 | Barrett................................ | 250/320 |
| 3,801,785 | 4/1974 | Barrett................................ | 250/323 |

*Primary Examiner*—James W. Lawrence
*Assistant Examiner*—D. C. Nelms

[57] ABSTRACT

An apparatus for use in the determination of focal spot size in X-ray tubes is provided with means for determining the position of the central beam, said means being characterized by a lens structure defining a pair of parallel upper and lower planes each providing a regular pattern of markings of distinctive opacity to X-rays, each pattern defining an array of discrete position coordinates in the respective plane, and each array being the projection of the other in a direction perpendicular to the planes. A photographic film is assembled in close proximity to the lower plane of the lens structure at a predetermined orientation relative thereto, and the assembly is located with respect to the X-ray tube so that the central beam will impinge perpendicularly on the upper plane of the lens structure, whereby to derive a composite photographic image of the patterns of markings in which the image components corresponding to the respective patterns coincide at the position of the central beam.

6 Claims, 5 Drawing Figures

APPARATUS FOR USE IN THE DETERMINATION OF FOCAL SPOT SIZE IN X-RAY TUBES

This invention relates to an apparatus for use in the determination of focal spot size in X-ray tubes.

The quality of an X-ray picture depends very largely on the size of the X-ray source, i.e., the focal spot. Accurate measurement of the focal spot size is therefore important in radiodiagnosis. The commonest measurement method used in such measurement is the "pinhole" technique in which a minute pinhole bored through a small gold-platinum alloy block, is placed in the path of the X-ray beam and an image of the focal spot is "focused" by this on to a film. The method has certain limitations, however. If the pinhole is not aligned with the exact center of the focal spot, the image obtained is distorted or even totally obscured. Furthermore, since the face of the anode from which radiation emerges is angled to the direction of the beam, the size of the focal spot, or the effective focal spot size, as seen from the film plane, varies considerably from one end of the film to the other. To standardize measurements, focal spot size must therefore be calculated at its exact center and with the pinhole absolutely aligned with the beam. Finding the exact central beam position has always involved a tedious process of trial and error, often resulting in overheating and sometimes resulting in damage to the X-ray tube. The smaller the focal spot the more difficult and tedious its measurement becomes.

The present invention provides an apparatus for use in focal spot size determination which overcomes these difficulties.

According to the present invention, an apparatus for use in the determination of focal spot size in X-ray tubes is provided with means for determining the position of the central beam, said means being characterized by an optical structure, herein referred to as a "lens structure" defining a pair of parallel upper and lower planes each providing a regular pattern of markings of distinctive opacity to X-rays, each pattern defining an array of discrete position co-ordinates in the respective plane, and each array being the projection of the other in a direction perpendicular to said planes. A photographic film is assembled in close proximity to the lower plane of the lens structure at a predetermined orientation relative thereto, and the assembly is located with respect to the X-ray tube so that the central beam will impinge perpendicularly on the upper plane of the lens structure, whereby to derive a composite photographic image of the patterns of markings in which the image components corresponding to the respective patterns coincide at the position of the central beam. Each pattern may be a rectangular grid pattern.

A preferred embodiment of the apparatus provides a rigid tubular housing adapted for connection at one end to an X-ray tube in registration with a port thereof, a lens holder in which the lens structure is mounted, a carrier member coupled to the other end of the housing and supporting the lens holder within the housing so that the central beam from the X-ray tube will impinge perpendicularly on the upper plane of the lens structure, and a closure cap for assembly with the tubular housing to close the other end thereof, the closure cap providing means for locating a photographic film and being retained by the carrier member so that the photographic film lies in close proximity to the lower plane of the lens structure at a predetermined orientation relative thereto.

One embodiment of the invention is illustrated by way of example in the accompanying drawings, in which.

Figure 1:
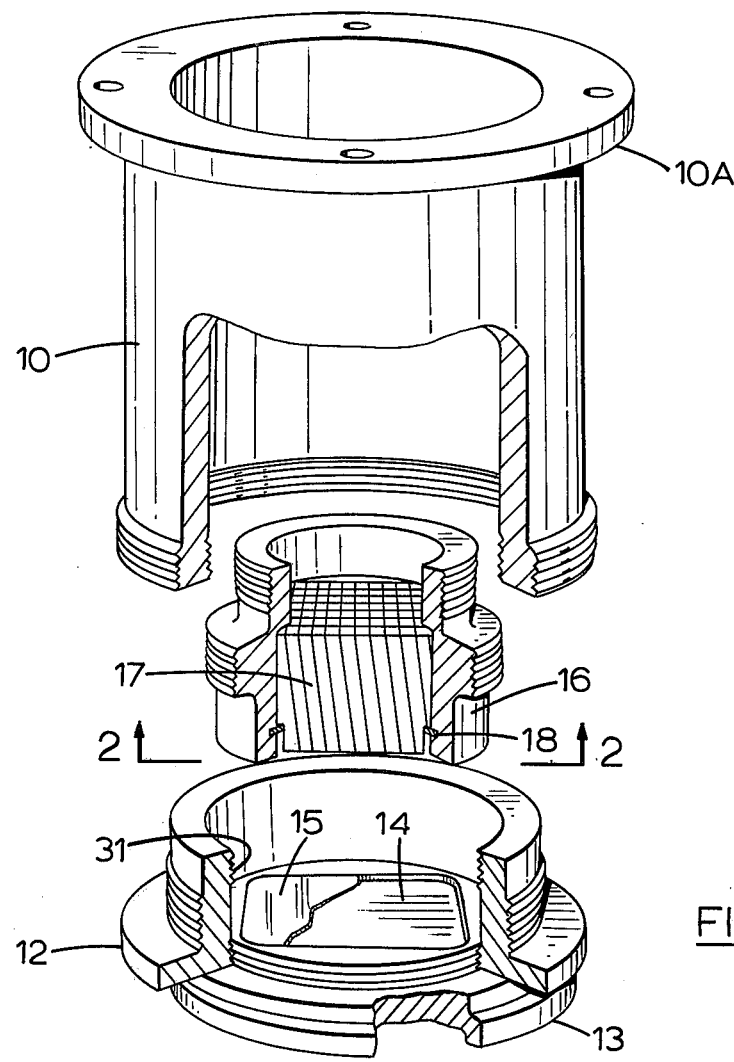
FIG. 1 is an exploded perspective view of an assembly for determining the central beam position, certain components of the assembly being broken away to show internal parts.
Figure 2:
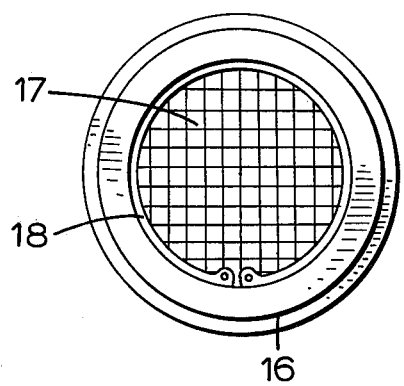
FIG. 2 is an underneath plan view on line 2—2 in FIG. 1.

In FIG. 1 there is shown a rigid tubular housing 10 having a flange 10A adapted to be connected directly, or by means of an adaptor, onto the X-ray tube housing port, or a collimator attached to the housing port so as to extend vertically down therefrom in registration with the housing port. A carrier ring 12 is screwed into the lower end of the housing 10, this carrier ring being provided with two bottom caps which are identical in size and shape. The bottom cap 13 shown in FIG. 1 is of aluminum; the second cap (not shown) is identical in all respects except that it is made out of clear acrylic plastic. The top face of the cap is formed with a shallow rectangular recess 14 in which a dental X-ray film 15 is accurately located so as to be oriented in a predetermined manner in relation to the cap. A "lens" assembly, comprising a lens holder constituted by a threaded collar 16 in which a grid component, or "lens structure" 17 is rigidly mounted and retained by a retaining ring 18, is screwed into the carrier ring 12 from above so as to be supported thereby. With the components of FIG. 1 assembled, the dental X-ray film 15, disposed horizontally, is now placed in a light-tight manner in close contact with the lower planar surface of the lens structure 17.

Figure 5:
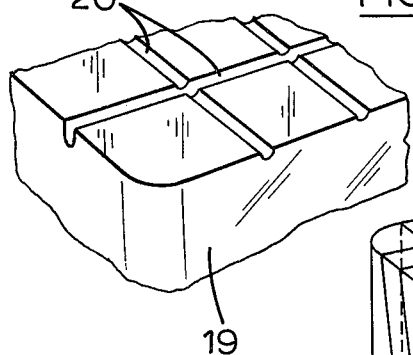
FIG. 5 illustrates a detail of the grid component.
Figure 4:
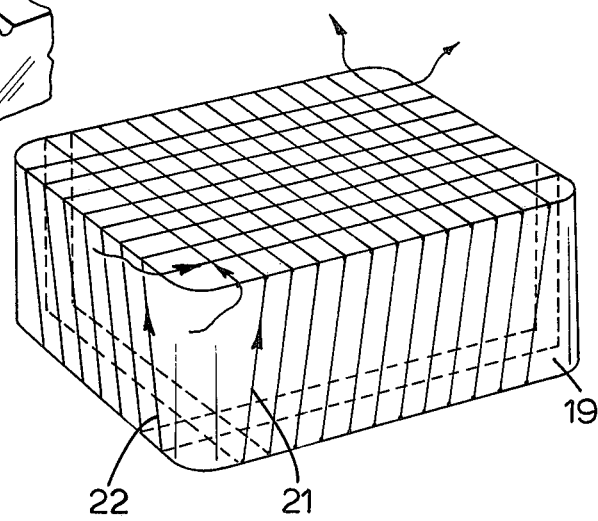
FIG. 4 illustrates the form of the grid component of the apparatus.

The lens structure 17, as illustrated in FIGS. 4 and 5, comprises a rectangular, parallel-sided block of acrylic plastic 19, the upper and lower horizontal faces of which are formed with grooves 20. The grooves are equally spaced and form a square double grid pattern. Two fine tungsten wires 21, 22 coiled round the block 19 and located by the grooves 20 define a pair of mutually orthogonal grids on each of the upper and lower faces of the block 19, the pairs of grids being identical and vertically aligned with one another.

Figure 3:
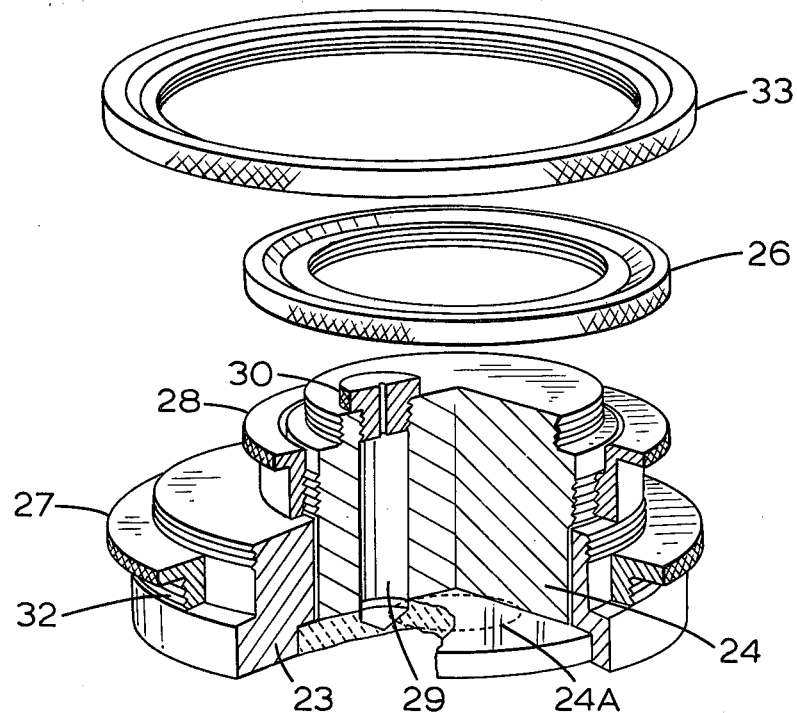
FIG. 3 is a fragmentary perspective view of a centering device and associated components of the apparatus.

The centering device proper, by which the pinhole of the spot size measuring device is aligned with the central beam, is illustrated in FIG. 3. This device consists of a first cylindrical block 23 having an eccentrically located circular aperture in which a second cylindrical block 24 is located and retained by a collar 28 having a knurled outer edge and retaining ring 26. The block 24 is of clear acrylic plastic. A threaded ring 27 is rotatable on the body 23, held by a retaining ring 33, the ring 27 having a knurled outer edge. On the lower face of the cylindrical block 24 a fine hairline circle 24A is engraved, the circle being concentric with the axis of rotation of the block 24. On the same radius as the hairline circle, a cylindrical bore 29 is drilled through the entire thickness of the block 24, this bore being threaded at its upper end to receive the pinhole element 30.

In order to find the location of the central beam of the X-ray tube, one inserts a dental X-ray film 15 into the recess 14 of the aluminum bottom cap. This cap is then screwed onto the carrier ring 12. The "lens" assembly is next inserted into the carrier ring 12 from above, bringing the lower surface of the lens structure 17 into close contact with the inserted dental film, thus providing a light-tight enclosure for the film. The carrier ring is next screwed onto the tubular housing 10. An X-ray exposure of 50 kV and 2mAs is adequate to obtain a sharply defined radiograph of the grids on the film. Since the upper and lower grid patterns are vertically aligned, and since the X-rays diverge from the source, there can be only one position in which the images of the upper and lower grids exactly coincide, this position corresponding to the position of the central beam. After the film has been removed, developed and dried, the position at which the images of the grids coincide is marked by a needle point. The marked dental film is now inserted into the recess 14 in the bottom cap of acrylic plastic, which is then inserted into the carrier ring 12 in place of the aluminum bottom cap. The carrier ring 12 is next assembled onto the centering device shown in FIG. 3, the internal threads 31 of the carrier ring engaging the external threads 32 of the rotatable ring 27. The first cylindrical block 23 is now rotated until the hairline circle of the eccentric centering block crosses over the needle mark on the film. With the pinhole element 30 removed it is a simple matter to place the center of the hole 29 exactly over the needle mark on the film by rotating the block 24 into position. The pinhole assembly 30 is next inserted into the block 24, and is now aligned exactly perpendicularly to the needle mark. The carrier ring can now be re-inserted into the tubular housing 10 and pictures of the focal spot can now be taken in any degree of magnification or minification by altering the pinhole to film distance at will, since the central beam now passes directly through the pinhole. A lead aperture is used to prevent X-rays penetrating the camera from fogging the film.

For really accurate determination of the focal spot size it is essential to know the focus to pinhole distance exactly. The measurement can, however, be obtained by reading the radiograph of the double grid somewhat differently. At a certain point towards the periphery of the double grid, two wires in the oblique ray can be seen to overlap exactly. Knowing the distance between the grid wires and the thickness of the grid, it is possible to calculate the focus to pinhole distance by the formula $$FFD = \frac{n + 1 \text{ mm}}{1 \text{ mm}} \times 10 \text{ mm}$$

where $n$ is the distance from the top overlapping grid wire to the central beam, the grids being of a mesh size of $1 \times 1$ mm separated by a block thickness of 10 mm. The distance between the pinhole and the film must be subtracted to arrive at the pinhole to focus distance.

Although a particular embodiment of the invention has been described by way of example, it will be appreciated that numerous modifications which lie within the scope of the invention are possible. For example, the lens structure 17 need not be constructed as shown. The essential requirement of the lens structure is that it should define a pair of parallel upper and lower planes each providing a regular pattern of markings of distinctive opacity to X-rays, each pattern defining an array of discrete position co-ordinates in the respective plane, each array being the projection of the other in a direction perpendicular to said plane.

What I claim as my invention is:

1. In an apparatus for use in the determination of focal spot size in X-ray tubes, means for determining the position of the central beam comprising:

a lens structure, said lens structure defining a pair of parallel upper and lower planes each providing a regular pattern of markings of distinctive opacity to X-rays, each pattern defining an array of discrete position coordinates in the respective plane, each array being the projection of the other in a direction perpendicular to said planes, means for assembling a photographic film in close proximity to the lower plane at a predetermined orientation relative thereto, and means for locating the assembly with respect to an X-ray tube so that the central beam impinges perpendicularly on said upper plane, whereby to derive a composite photographic image of said patterns of markings in which the image components corresponding to the respective patterns coincide at the position of the central beam.

2. An apparatus according to claim 1, wherein each pattern of markings is a grid pattern formed by intersecting sets of linear markings which are opaque to X-rays.

3. An apparatus according to claim 2, in which each pattern of markings is a rectangular grid pattern.

4. An apparatus according to claim 1, wherein the lens structure is constituted by a block which is transparent to X-rays, the block having a pair of parallel upper and lower planar surfaces defining said upper and lower planes, each surface providing a grid pattern of intersecting linear grooves, said markings being constituted by wires extending along the grooves.

5. In an apparatus for use in the determination of focal spot size in X-ray tubes, means for determining the position of the central beam comprising:

a rigid tubular housing adapted for connection at one end to an X-ray tube in registration with a port thereof, a lens structure, said lens structure defining a pair of parallel upper and lower planes each providing a regular pattern of markings of distinctive opacity to X-rays, each pattern defining an array of discrete position co-ordinates in the respective plane, each array being the projection of the other in a direction perpendicular to said planes, a lens holder, the lens structure being mounted within the holder, a carrier member coupled to the other end of said housing and supporting the lens holder within the housing so that the central beam will impinge perpendicularly on said upper plane of the lens structure, and a closure cap for assembly with the tubular housing to close said other end thereof, the closure cap providing means for locating a photographic film and being retained by said carrier member so that the photographic film lies in close proximity to the lower plane of the lens structure at a predetermined orientation relative thereto, whereby to derive a composite photographic image of said patterns of markings in which the image components corresponding to the respective patterns coincide at the position of the central beam.

6. An apparatus according to claim 5, including a pinhole assembly which is interchangeable with the lens holder and the lens structure to be supported by the carrier member, the pinhole assembly including a first cylindrical block supported by the carrier member and having an eccentric bore therein, means for rotating the first cylindrical block about a first axis parallel to the axis of the tubular housing, a second cylindrical block located within said eccentric bore, means for rotating the second cylindrical block about a second axis parallel to the first, and a pinhole element mounted on the second cylindrical block, the pinhole element providing a pinhole which is aligned with a throughbore in the second block which is parallel to and offset from said first and second axes.

* * * * *